T. HOLMES.
PROCESS OF PRESERVING DEAD BODIES.
No. 188,014. Patented March 6, 1877.
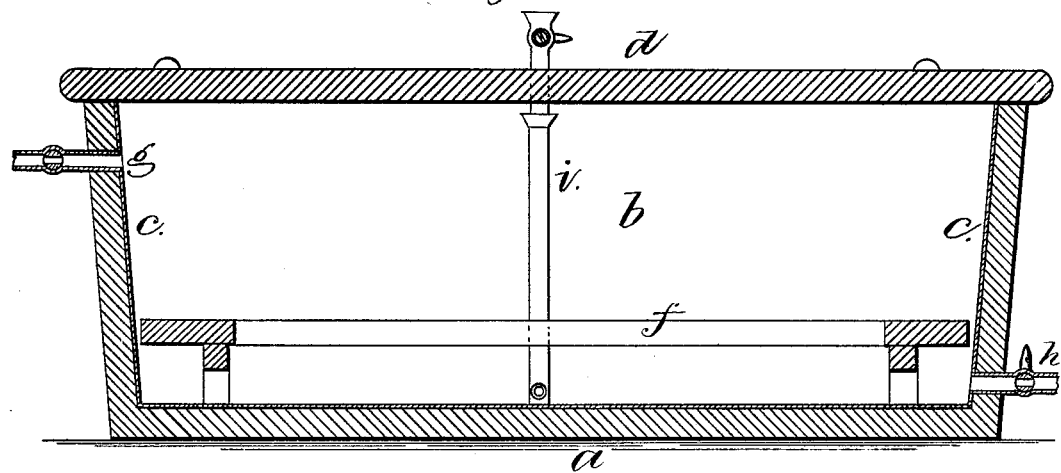
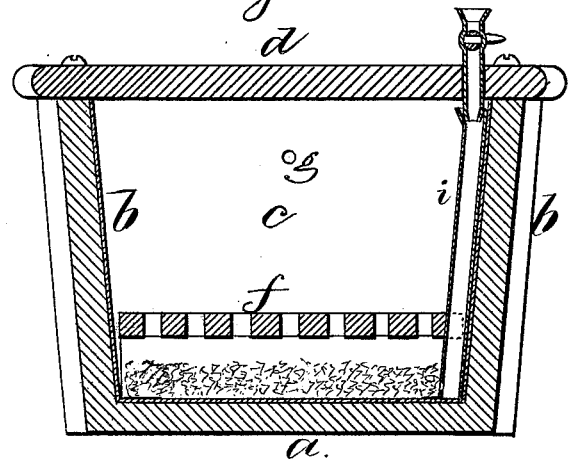

UNITED STATES PATENT OFFICE.

THOMAS HOLMES, OF BROOKLYN, NEW YORK.

IMPROVEMENT IN PROCESSES OF PRESERVING DEAD BODIES.

Specification forming part of Letters Patent No. 188,014, dated March 6, 1877; application filed October 23, 1876.

*To all whom it may concern:*

Be it known that I, THOMAS HOLMES, M. D., of Brooklyn, in the county of Kings and State of New York, have invented an Improvement in Preserving Dead Bodies, of which the following is a specification:

I make use of the vapors from a solution of bisulphite of lime and also sulphurous-acid gas, and bring the same in contact with the dead body or animal matter while in a confined chamber or coffin. The effect is that the animal tissues are kept from the atmosphere, and the said vapors and gases act as preservatives, and also neutralize any gases evolved from the dead person, so that the risk of infection is lessened, and the body maintained in a condition that will allow of its removal from place to place under circumstances often arising before final burial.

This improvement is also available in preserving meats, poultry, &c., while being sent to market, and also for destroying vermin in tombs and receiving-vaults, &c.

The coffin or antiseptic chamber is a closed vessel that receives the body, and is, by preference, of the form represented by the longitudinal section, Figure 1, and the cross-section, Fig. 2.

The bottom $a$, sides $b$, ends $c$, and lid $d$ are of suitable size and shape, and there is, by preference, a grating or slats, $f$, upon the bottom $a$, to support the body, an inlet pipe and cock, $g$, at one end, a pipe and cock, $h$, at the other end, and a pipe and cock, $i$, near the middle. The lid is removable, and is to be secured tightly after the body is in place. The coffin should be lined with sheet-lead.

It is preferable to introduce charcoal, sawdust, coke, or similar porous material beneath the slats $f$, so that the same may become saturated with the solution of bisulphite of lime, that is poured into the pipe $i$, and spreads upon the bottom of the coffin, and any surplus overflows and is drawn off by the pipe $h$.

The evaporation from the solution of bisulphite of lime causes the interior of the coffin or chamber to be filled with gases or fumes that are of a preservative character, and which destroy maggots or any animalculæ, and prevents the rapid change and decomposition incident to death, especially in warm weather.

The solution of bisulphite of lime is made by passing sulphurous-acid gas into a saturated solution of lime-water until a gravity of about 10° Baumé is obtained.

Sulphurous acid gas is next introduced by the pipe $g$ into the chamber. This may be conveniently obtained from the combustion of sulphur, and it commingles with the gases from the bisulphite of lime, adding more sulphur to the same, intensifying its action, and maintaining the preservative qualities of the gases and vapors in the antiseptic chamber.

After the body has been exposed to the action of these gases the supply-pipes can be removed, and the antiseptic chamber tightly closed so as to retain the body in an atmosphere of these preservative gases as long as required under ordinary circumstances, or during removal.

I claim as my invention—

The process of preserving bodies in a closed antiseptic chamber, which consists in subjecting them to the vapors evolved from a solution of bisulphite of lime combined with sulphurous-acid gas, substantially as and for the purposes set forth.

Signed by me this 17th day of October, A. D. 1876.

THOS. HOLMES, M. D.

Witnesses:
 GEO. T. PINCKNEY,
 CHAS. H. SMITH.